Jan. 18, 1966   W. E. HENDRICKS   3,229,954
SEAT SUSPENSION MEANS
Filed Oct. 14, 1963

INVENTOR.
WILLIAM E. HENDRICKS
BY John H. Widdowson
ATTORNEY

United States Patent Office 3,229,954
Patented Jan. 18, 1966

3,229,954
SEAT SUSPENSION MEANS
William E. Hendricks, 614 S. Minnesota, Wichita, Kans.
Filed Oct. 14, 1963, Ser. No. 316,089
4 Claims. (Cl. 248—402)

This invention relates to suspension means, more particularly to a vehicle seat suspension means. More specifically the invention relates to a suspension means for a seat mounted on a bicycle. The invention relates to a seat suspension means adapted to provide a smooth comfortable ride, which seat suspension means can be either embodied into a new bicycle or other similar vehicle, or made available in kit form to be installed on an existing bicycle or other similar vehicle without the necessity of modifying the vehicle frame structure.

The conventional bicycle as marketed, sold, and used is normally provided with a seat that is fixedly mounted on the frame. Although the seats are normally provided with coil springs, or some other type of spring within the seat proper, the shock absorbing properties of these springs leave much to be desired. The springs in the seat are in general designed to support the maximum weight of any potential rider who may use the bicycle. Anyone whose weight is less than this designed weight receives a great deal of the shock and vibration transmitted from the frame and wheels of the bicycle to the seat support when riding same. Further, the bicycle seats are not in general designed to efficiently insulate the rider from the shock and vibration normally generated as the bicycle is in operation.

Bicycle manufacturers have resorted to a number of expedients in order to provide a more smooth and comfortable ride. However, none of these expedients have been entirely satisfactory in operation. One expedient is to provide the bicycle with large balloon tires to absorb the road shock, etc. However, the use of balloon tires increases the rolling friction of the bicycle and is not effective to insulate the rider seated on the bicycle from the heavier bumps, vibrations, etc., as for example, driving the bicycle over a curb. Another expedient commonly used was providing the front fork of the bicycle with a suspension means to absorb the road shocks. This suspension means, though partially successful, did not fully satisfy the need for a smoother softer more comfortable ride. This type of suspension means insulated the frame and the rider from only shocks encountered by the front wheel leaving the back wheel relatively un-insulated and free to transmit vibrations to the rider. Also, this suspension means is a detriment when vigorously pumping the pedals of the bicycle, since in use it allows the front portion of the frame to vibrate up and down thereby utilizing a portion of the pumping or pedalling energy intended to drive the bicycle. In addition, the suspension means are not capable of insulating the frame from large bumps or vibrations. Also the cost of such a suspension means is relatively high prohibiting its use in relatively inexpensive bicycles. In most of the aforementioned expedients, namely the use of balloon tires on a bicycle and the use of a front wheel suspension means, the incorporation of these devices in an existing bicycle is prohibitive because of the expense and installation costs involved. Substituting a balloon tire for a small tire involves purchasing a new rim and a new tire, and possibly spokes for a wheel, and then installing the new rim on the existing hub. The installation is a tedious, exacting, and time consuming operation. In regard to the front wheel suspension means, the suspension means is expensive and also difficult to install, usually necessitating major modifications of the frame and/or purchase of a new fork. Thus, the past efforts toward providing the rider of a bicycle with a smooth soft ride were relatively unsuccessful.

I have invented a new seat suspension means adapted to be used in a vehicle having a seat and frame. The seat suspension means of my invention has an elongated means slidably mounted on the vehicle frame with the seat mounted thereon. A first resilient means is operatively associated with the elongated means and the frame for maintaining the elongated means, with the seat mounted thereon, in extended load bearing relation. A second resilient means is secured to the frame and to the elongated means for maintaining the seat in aligned relation to the frame.

A specific preferred embodiment of the second resilient means is a bowed or V-shaped spring with apertures on the end portions thereof. Preferably the apertured portions consist of tubular shaped eyelets either rolled in the end of the spring or welded thereto. In a preferred specific embodiment of my suspension means the second resilient means is secured to the frame and to the elongated means with annular clamps. The resilient means is pivotally secured to the annular clamps by positioning the eyelets over the bolt means used to tighten the clamp.

The new suspension means of my invention provides a rider using same with a smooth, soft, relatively vibration-free ride. The suspension means of my invention is relatively inexpensive and can be installed on either new bicycles during manufacture, or can be installed on conventional existing bicycles without modifications or alterations of the frame. The suspension means of my invention can be sold in kit form, which kit can be used to modify any conventional bicycle. The kit can be easily, quickly, and simply installed by an average unskilled person with a very minimum amount of equipment. The installation can be done in a relatively short time and does not necessitate modification of the frame which might weaken or change its appearance. After the suspension means has been installed on a bicycle or other vehicle the seat position can be readily adjusted to suit the desired and/or the physical size of rider intending to use the bicycle. Also, the softness of the ride can be adjusted very quickly with a very minimum of time and effort. The seat suspension means of my invention is provided with an inherent built in shock absorber to limit the extent of the amplitude of the seat movement. The shock absorber effect results from the action of the second resilient means, more specifically, the V-shaped spring. When the seat stem recoils after a severe shock, the V-shaped spring exerts an opposite force on same after it passes its formed position, which force becomes progressively stronger as the V-shaped spring is progressively extended beyond its formed position. This inhibits the recoil.

An object of this invention is to provide a new suspension means.

Another object of this invention is to provide a new seat support suspension means for use on a bicycle or other vehicle.

Still another object of this invention is to provide a new seat suspension means for a bicycle or other vehicle which can be installed on a conventional bicycle without modifying the frame of the bicycle.

Another object of this invention is to provide a seat suspension means which can be marketed and sold in an inexpensive kit form, which kit can be used on any type bicycle.

Still another object of this invention is to provide a new suspension means for the seat of a bicycle or other vehicle which can be easily, quickly, and simply installed by an average unskilled person in a minimum of time, and which installation requires a minimum of equipment.

Yet another object of this invention is to provide a new seat suspension means for a bicycle seat or other vehicle which can be readily adjusted in position to suit the physical requirements of the individual rider.

Another object of this invention is to provide a new seat suspension means for a bicycle or other vehicle which can be adjusted to vary the softness or firmness of the ride.

Another object of the invention is to provide a seat suspension means with an inherent shock absorber action.

Yet another object is to provide a seat suspension means for a vehicle seat that can be adjusted to accommodate riders of varying weights.

Another object of this invention is to provide an inexpensive but dependable seat suspension means for a bicycle.

Other objects and advantages of the invention will be apparent to those skilled in the art from the disclosure set forth herein.

Drawings of preferred specific embodiments of the invention accompany and are a part hereof, and such are to be understood to not unduly limit the scope of the invention. In the drawings:

FIG. 3 shows another preferred specific embodiment of my invention for use with a bicycle frame having a split mast with two integral apertured clamping ears secured thereto.

FIG. 4 is a top elevational view of the mast structure shown in FIG. 3.

FIG. 5 is a fragmentary view of another preferred specific embodiment of my invention illustrating a different arrangement of the supporting compression spring in relation to the seat stem.

Figure 2:
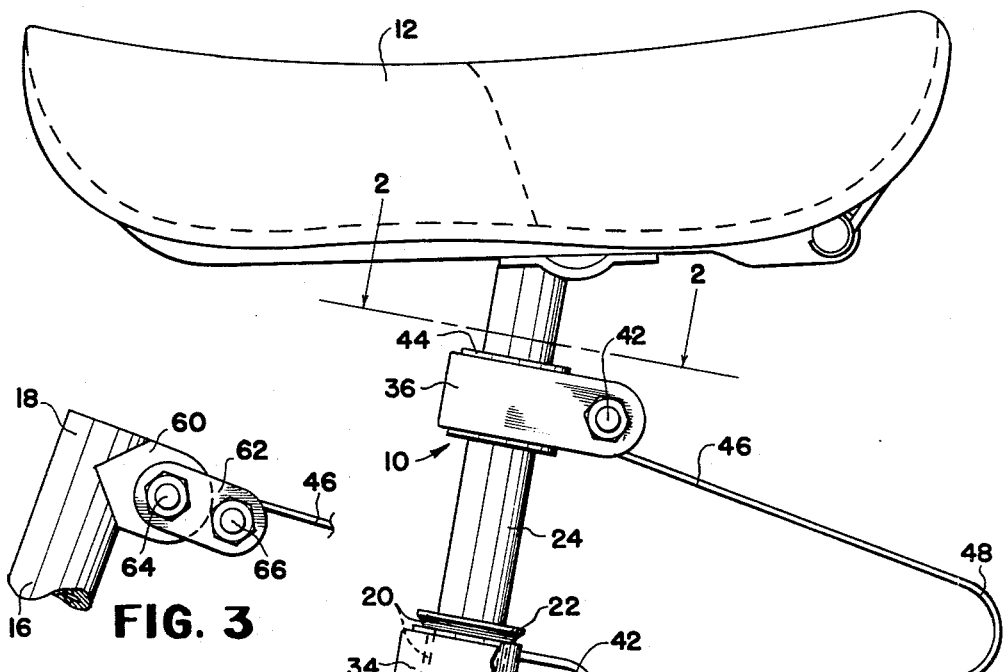
FIG. 2 is a view taken on line 2—2 of FIG. 1.
Figure 2:
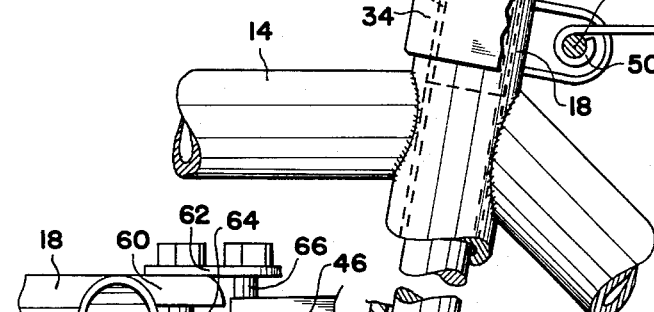
Figure 2:
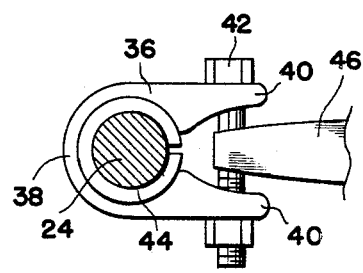

The following is a discussion and description of the new seat suspension means of my invention made with reference to the drawings, wherein the same reference numerals are used to indicate the same or similar parts and/or structure. The discussion and description are of preferred specific embodiments of the new seat suspension means of my invention and it is to be understood that such are not to unduly limit the scope of my invention.

Figure 1:
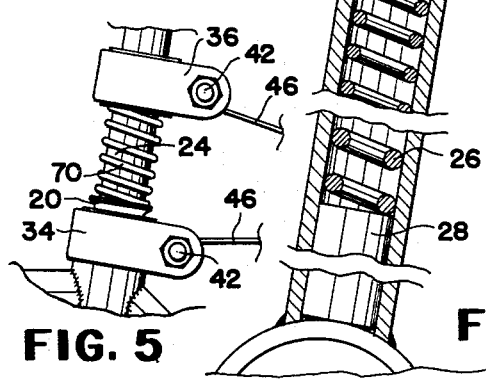
FIG. 1 shows a preferred specific embodiment of the new suspension means of my invention mounted on a frame of a conventional bicycle.

Referring now to the drawings, FIGS. 1 through 5, there is depicted in FIG. 1 the seat suspension means 10 of my invention particularly adapted to be mounted on a bicycle having a seat 12, and a frame 14 provided with a mast element 16 having a split tubular end portion 18. The seat suspension means 10 has a cylindrically shaped insert 20 having a flared top portion 22 snugly disposed in the split tubular end portion 18 of the mast element 16. The flared top portion 22 abuts the top edge of the mast element 16, preventing it from sliding down within the same. The insert 20 has a relatively thin wall but is designed to have sufficient strength to resist buckling when the top portion 18 of the mast element 16 is clamped or compressed. The mast element 16 can be made of any suitable type of material. Preferably it is made of metal having embodied therein graphite or other suitable lubricant. A relatively long elongated rod-like seat stem 24 having a reduced top portion is disposed in mast element 16 in slidable telescopic relation to insert 20, with the reduced top portion protruding. A first relatively heavy compression spring 26, having an outside diameter slightly less than the inside diameter of the mast element is disposed in the mast element 16 adjacent the bottom thereof. If desired a small dowel or plug 28 can be positioned in the bottom of the mast element 16 with the spring 26 abutting same. A second relatively light compression spring 30 having an outside diameter slightly less than the inside diameter of the mast element 16 is disposed in the mast element above and preferably supported on first spring 26. The spring 30 being relatively light is adapted to be more easily compressed than spring 26. A dowel 32 having an outside diameter slightly less than the inside diameter of the mast element is disposed in the mast element 16 and supported on the top of the second spring 30. The dowel 32 is of a length to support the seat stem 24 and seat 12 at a predetermined position relative to the mast element and frame. Thus the dowel serves an important adjusting function. For example, if the rider of the bicycle is relatively tall he would wish the seat 12 to be positioned at a relatively high position above the frame 14. Therefore, he would adjust the position of the seat by cutting a relatively long length of dowel 32 to be inserted in the mast. If a person wishing to ride the bicycle is relatively short he would wish the seat 12 to be positioned at a relatively short distance above frame 14. This person would utilize a relatively short length of dowel 32 in the mast element in order to position the seat 12 at the proper height. The proper length of the dowel 32 can be readily determined by first inserting the seat stem 24 until it abuts the spring 30, and then making a first mark on the seat stem. Then the seat is raised to the desired height and a second mark is made on the stem 24. The distance between the two aforementioned marks represents the proper length of dowel 32. The dowel can be of any material such as wood, plastic, etc. I have found that a length of broom handle cut to the proper length works very well.

A torsion knee spring means is provided in my seat suspension means. The torsion knee spring means assembly has first and second clamp elements 34 and 36. Preferably clamp elements 34 and 36 are identical in structure. Each of clamps 34 and 36 has a split annular central portion 38 having an inside diameter approximately equal or slightly in excess of the outside diameter of the split tubular end portion 18, and two protruding generally parallel spaced clamping ear portions 40 integral with central portion 38. The clamping ear portions 40 have aligned apertures therein, and have a bolt means 42 positioned in the aligned apertures. The first clamp element 34 is disposed about and engages the split tubular end portion 18 of the mast. The ear portions 40 of clamp 34 are positioned to extend in a rearwardly direction. A split tubular shaped adapter 44 is provided having an inside diameter equal to or slightly in excess of the outside diameter of the seat stem 24, and an outside diameter approximately equal to the outside diameter of the split tubular end portion 18 of the mast 16. Adapter 44 is disposed about the seat post 24 in spaced relation to the clamp means 34. Second clamp means 36 is disposed about the adapter 44 with the clamping ear portions 40 positioned to extend in a rearwardly direction. The bolt means 42 serves to tighten the clamp 36 about the adapter 42 to secure the resulting assembly in rigid relationship. A spring means 46 is provided having a generally V-shaped central portion 48 and tubular eyelet portions 50 on each end of the central portion 48. The length of the tubular eyelets 50 is less than the inside distance between the protruding clamping ears 40 of the clamp elements 34 and 36. By providing this relationship between the spaced ears and the tubular eyelets the ends of the spring 46 can be pivotally secured to the clamp elements by a single bolt in each clamp element. The spring means 46 shown in FIG. 1 is operatively joined to the first and second clamp elements 34 and 36 with one eyelet 50 disposed about the bolt means 42 of the first clamp element 34 and the other eyelet of the spring means 46 disposed about the bolt element 42 of the second clamp element 36. Any suitable type of spring can be substituted for spring 46. However, I prefer to use a spring 46 made of a flat spring steel bent in the form of a V or a U shaper with eyelets on the end portions thereof. The spring 46 is the general type normally found on traps and the like. The eyelets 50 can be either rolled into the end portions of the spring as shown, or welded thereto.

The suspension means 10 of my invention is adapted to provide a relatively soft ride by the combined action of the second compression spring 30 and the V-shaped spring 46. In use the spring 30 is selected so that when it is supporting the weight of the rider it is in a partially compressed condition. Spring 30 will then absorb all of the minor small vibrations and shocks. The spring 46 assists in this support. However, if the bicycle or other vehicle should receive a severe jolt or shock the small spring 30 would be completely compressed and the relatively large spring 26 take over and absorb the shock. Further, spring 46 serves as a torsion knee spring to maintain the proper alignment of seat 12 relative to frame 14. Spring 46 also serves as a shock absorber preventing the seat 12 and stem 24 from bouncing and projecting too far out of mast 16 upon rebounding from a severe jolt or shock. The shock absorber effect results from the opposing action of spring 46 when it is bent beyond its formed or initial shape by the recoil action of the support springs. As the spring 46 is progressively spread beyond its formed shape or position, the force it exerts in opposition to the supporting springs during the recoil progressively increases. This progressive relationship effectively inhibits the recoil. Spring 46 also maintains the stem 24 in mast 16 in the event that the rider of the bicycle should lift the bicycle using the seat as a handle. The softness of the ride can also be controlled by securing the top clamp 36 at different positions along stem 24 to make spring 46 oppose the action of compression springs 26 and 30, or to relieve them of tension.

The seat suspension means of my invention can be conveniently handled and sold in a kit form to owners of conventional bicycles for installation on same. The kit would preferably contain a seat stem 24, an insert 20, an adapter 44, two identical annular clamps 34 and 36, a spring 46, compression springs 26 and 30 and a short length of dowel 32. In order to install the seat suspension means on a conventional bicycle the person installing it would remove the original seat stem and seat from the frame. The seat stems are conventionally secured to the bicycle frame by either a split mast provided with a means to clamp the split portion, as illustrated in FIG. 1 and FIG. 4 of the drawings, or the stem is provided with an expanding mechanism on the end disposed within the mast. The springs 26 and 30 could then be inserted in the mast element of the bicycle frame by merely dropping same in the open top end. The length of dowel is also inserted through the open top end of the mast. The insert 20 is then positioned in the open top of the mast of a frame, and the original clamp removed from the top end. Clamp 34 is then positioned loosely over the end of the mast element. The seat can be removed from the original seat stem and secured to the seat stem provided in the kit. Adapter 44 is positioned about the new seat stem and clamp 36 mounted thereon. The seat stem 24 is then positioned in the mast element in slidable telescopic relation to insert 20, and the V-shaped spring mounted on the bolt means in clamps 34 and 36. The length of dowel 32 can be determined prior to mounting the V-shaped spring on the clamp means.

FIGS. 3 and 4 illustrate a mast of a bicycle frame having integral spaced clamping ears on same. This type of mast is common on English type bicycles. In this type frame the clamp 34 described hereinbefore cannot conveniently be used. Here two links 62 are mounted on the protruding clamping ears 60 by bolt means 64. A second bolt means 66 is inserted through the remaining apertures in link means 62 and through the eyelet 50 of spring 46.

FIG. 5 shows still another embodiment of my invention. In this embodiment the seat stem 24 is mounted in slidable relationship to an insert mounted in the mast as in the embodiment shown in FIG. 1. Also the torsion knee spring means assembly is similar to the embodiment in FIG. 1. However, compression spring 70, mounted about seat stem 24, is provided. Compression springs 26 and 30 and dowel 32 as shown in FIG. 1 can then be deleted, if desired, since compression spring 70 serves as the main support for the seat. In order to adjust the height of this preferred specific embodiment of my invention, the bolt 42 in clamp 36 is loosened and the stem 24 moved relative to the clamp to the desired height. The bolt is then tightened.

While I have described and illustrated preferred specific embodiment of my invention, it is to be understood that the seat suspension means and combinations therewith, and elements disclosed, can be made in other forms than herein described and suggested without departing from the spirit of my invention.

I claim:

1. In a bicycle having a seat and a frame provided with a mast element having a split tubular end portion, the improvement comprised of a suspension means for the bicycle seat operatively mounted on the frame of said bicycle, said suspension means having a cylindrically shaped insert having a flared top portion snugly disposed in the split tubular end portion of the mast element, an elongated rod-like seat stem disposed in said mast element in slidable telescopic relation to said insert with the top portion protruding, a first relatively heavy compression spring disposed in said mast element adjacent the bottom thereof, a second relatively light compression spring disposed in said mast element above and supported on said first spring, a dowel disposed in said mast element supported on the top of said second spring and contacting at its top end the lower end of said seat stem, said dowel being of a length to support and space in combination with said first and second spring, said seat stem at a predetermined position relative to said mast element, a torsion knee spring means comprising, first and second clamp elements, each of said clamp elements having a split annular central portion with an inside diameter approximately equal to or slightly in excess of the outside diameter of said split tubular end portion of said mast, two protruding generally parallel spaced clamping ear portions integral with the ends of said split central portion, said clamping ear portions having aligned apertures therein, bolt means positioned in said aligned apertures, said first clamp element disposed about and engaging the split tubular end portion of said mast with said ear portions extending in a rearwardly direction, a split tubular shaped adapter having an inside diameter equal to or slightly in excess of the outside diameter of said seat post and an outside diameter approximately equal to the outside diameter of said split tubular end portion of said mast, said split tubular shaped adapter disposed about and engaging said seat stem in spaced relation to said first clamp means, said second clamp means disposed about said split tubular shaped adapter with said clamping ear portions extending in a rearwardly direction, a spring having a generally V-shaped central portion and tubular eyelet portions of a length less than the inside distance between the protruding ears of said clamp elements on each end portion of said central portion, said spring operatively joined to said first and second clamp elements with one eyelet disposed about the bolt means of said first clamp element and the other eyelet of said spring means disposed about the bolt element of said second clamp element, said suspension means for said seat adapted to provide a relatively soft ride by the combined action of said second compression spring and said V-shaped spring, and a firm bottoming-out action for heavy jolts by the action of said first relatively heavy compression spring, while said V-shaped spring also acts in the capacity of a shock absorber and also as a means to maintain a proper alignment of the seat relative to the bicycle frame.

2. In a bicycle having a seat and a frame provided with a mast element having a split tubular end portion, the improvement comprised of a suspension means for said seat operatively mounted on the frame of said bicycle, said suspension means including a cylindrically shaped insert disposed in the split tubular end portion of said mast element, an elongated rod-like seat stem disposed in said mast element in slidable relation to said insert, a first relatively heavy compression spring disposed in said mast element adjacent the bottom thereof, a second relatively light compression spring disposed in said mast element above and supported on said first spring, a dowel means disposed in said mast element, said dowel means being of a length to support in combination with said first and second springs, said seat stem at a predetermined relation relative to said mast element, a means securing said bicycle seat to said seat stem, a torsion knee spring means comprising, first and second clamp elements, each of said clamp elements having a split annular central portion and two protruding, generally parallel, spaced ear portions integral with the split ends of said split central portion, said ear portions having aligned apertures therein, bolt means positioned in said aligned apertures, said first clamp element disposed about and engaging the split tubular end portion of said mast element with said ear portions extending in a rearwardly direction, an adapter disposed about and engaging said seat stem in spaced relation to said first clamp means, said second clamp means disposed about said adapter with the ear portions extending in a rearwardly direction, a spring having a generally V-shaped central portion, and cylindrically shaped eyelet portions of a length less then the distance between the protruding ears of said clamp elements on each end portion of said V-shaped central portion, said spring operative joined to said first and second clamp elements with one eyelet disposed about the bolt means in said first clamp element and the other eyelet of said spring means disposed about the bolt means in said second clamp element, said suspension means for said seat adapted to provide a soft ride by the combined action of said second compression spring and said V-shaped spring, and a firm bottoming-out action for heavy jolts by the action of said first relatively heavy compression spring, while said V-shaped spring also acts in the capacity of a shock absorber and also as a means to maintain a proper alignment of the seat relative to the bicycle frame.

3. In a bicycle having a seat and a frame provided with a mast element having a split end portion with apertured spaced ears integrally joined to the ends of said split end portion, the improvement comprised of a suspension means for said seat operatively mounted on the frame of said bicycle, said suspension means including a cylindrically shaped insert disposed in the split end portion of the mast element, an elongated rod-like seat stem disposed in said mast element in slidable telescopic relation to said insert, a compression spring disposed in said mast element, a dowel means disposed in said mast element supported by said compression spring, said dowel being of a length to support said seat stem in a predetermined relation relative to said mast element, a means securing said bicycle seat to said seat stem, a torsion knee spring means comprising, a spring having a generally V-shaped central portion and tubular shaped eyelets on each end portion of said central portion, means for securing one end of said V-shaped spring to the top of said mast element comprising, two flat link means having apertures adjacent each end thereof, first bolt means disposed in said link means and protruding ears of said split tubular end portion of said mast securing said link means to said mast, and a second bolt means positioned in the apertures opposite said first mentioned apertures in said link means and disposed in one of said eyelets of said spring means, a clamp element, said clamp element having a split annular central portion with two protruding generally parallel spaced clamping ear portions having aligned apertures therein integral with the split end portions of said split annular central portion, bolt means positioned in said aligned apertures, a split tubular shaped adapter disposed about and engaging said seat stem in spaced relation to the top of said mast element, said clamp means disposed about said split adapter with the ear portions extending in a rearwardly direction and with the second of said eyelets of said V-shaped spring positioned about said bolt means in said clamp element, said suspension means for said seat adapted to provide a relatively smooth soft ride with the V-shaped spring means acting in the capacity of a shock absorber and also a means to partially support said seat.

4. In a bicycle having a seat and a frame provided with a mast element having a split tubular shaped end portion, the improvement comprised of a suspension means for said seat operatively mounted on the frame of said bicycle, said suspension means including a cylindrically shaped insert disposed in the split end portion of said mast element, an elongated seat stem disposed in said mast element in slidable telescopic relation to said insert, a torsion knee spring means comprising, first and second clamp elements, each of said elements having a split annular central portion and two protruding generally parallel spaced ear portions having aligned apertures therein and integral with the ends of said central portion, bolt elements positioned in said aligned apertures, said first clamp element disposed about and engaging the end portion of said mast with said ear portions extending in a rearwardly direction, a split tubular shaped adapter disposed about and engaging the seat stem and positioned in spaced relation to said first clamp means, said second clamp means disposed about said adapter with said ear portions extending in a rearwardly direction, a spring having a generally V-shaped central portion and tubular eyelet portions on each end of said central portion, said spring operatively joined to said first and second clamp elements with one eyelet disposed about the bolt means in said first clamp element and the other eyelet of said clamp means disposed about the bolt element in said second clamp element, a compression spring disposed about said seat stem in abutting relation to said first clamp means and said second clamp means and providing a resilient support for said seat stem, means for securing said bicycle seat to the top of said seat stem, said suspension means adapted to provide a smooth soft comfortable ride for a rider when mounted thereon.

References Cited by the Examiner

UNITED STATES PATENTS

| 568,593 | 9/1896 | Watson | 248—400 |
| 568,977 | 10/1896 | Helmore | 248—400 X |
| 584,944 | 6/1897 | Little | 248—401 X |
| 807,749 | 12/1905 | Ledig | 248—157 X |
| 1,711,085 | 4/1929 | D'Arcy | 248—402 X |
| 2,141,849 | 12/1938 | Baer | 248—204 X |
| 2,162,399 | 6/1939 | Hayes | 248—403 X |
| 2,710,207 | 6/1955 | Mueller | 248—411 X |

FOREIGN PATENTS

| 883,410 | 7/1953 | Germany. |

CLAUDE A. LE ROY, *Primary Examiner.*